May 1, 1956     K. B. MacDOUGALL     2,743,793
DEVICE OR MECHANISM FOR AUTOMATICALLY OR MANUALLY
ADJUSTING AUTOMOTIVE VEHICLE BRAKES
Filed Sept. 5, 1951     2 Sheets-Sheet 1
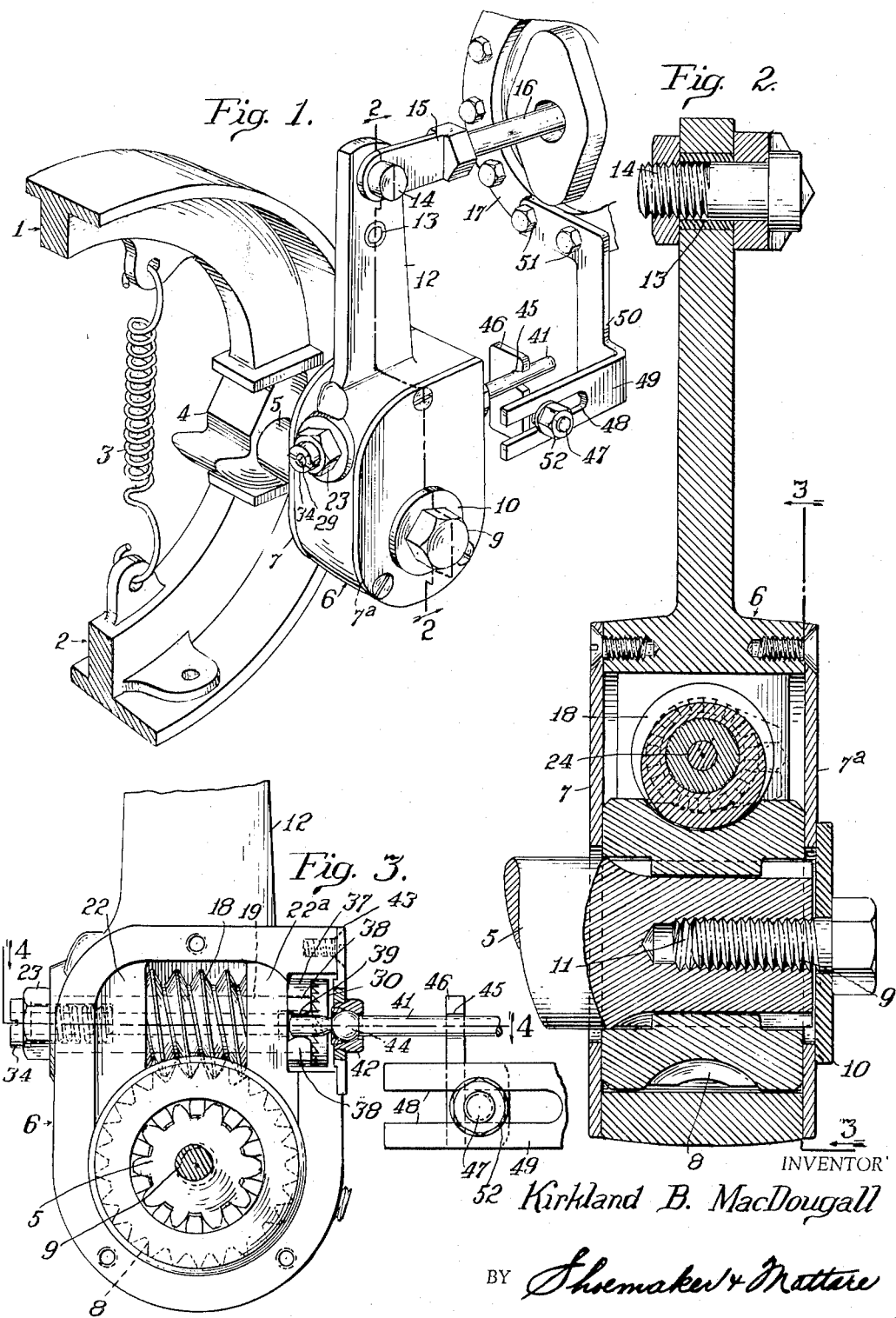
INVENTOR
Kirkland B. MacDougall
BY Shoemaker & Mattare
ATTORNEYS

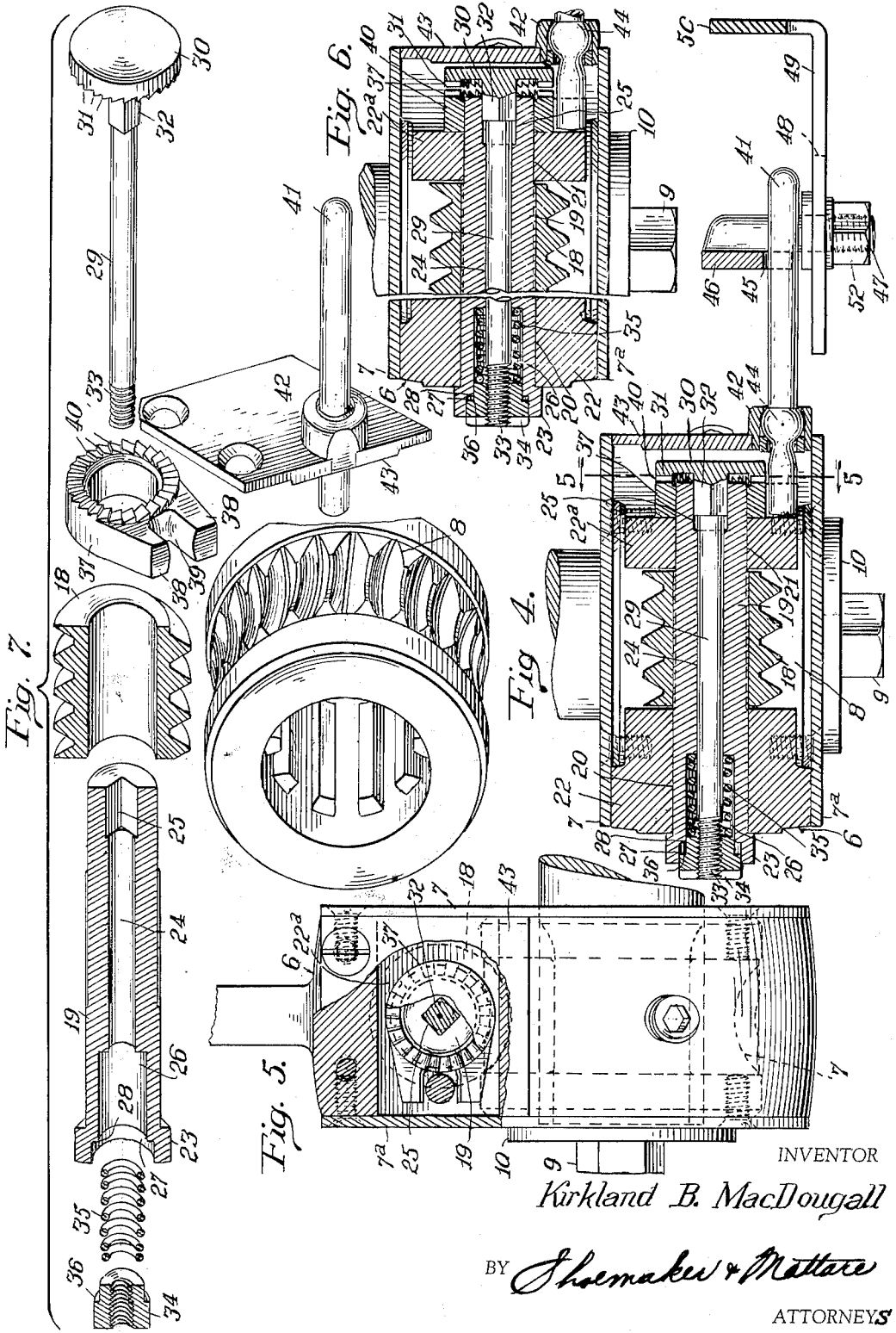

United States Patent Office 2,743,793
Patented May 1, 1956

2,743,793

DEVICE OR MECHANISM FOR AUTOMATICALLY OR MANUALLY ADJUSTING AUTOMOTIVE VEHICLE BRAKES

Kirkland B. MacDougall, Benton, Pa.

Application September 5, 1951, Serial No. 245,114

10 Claims. (Cl. 188—196)

This invention relates to a device for adjusting the operating means of vehicle brakes and particularly the brakes of automotive vehicles which are cam actuated.

When the brakes are applied, the linings are subjected to heavy pressure and friction which cause them to be worn to such an extent that the proper braking of the vehicle cannot be attained. It is then necessary to make adjustments to compensate for this wear. Most vehicles have manually operated mechanisms for individually adjusting the brake applying means and some have mechanisms for automatically effecting such adjustments while the vehicle is in motion but, so far as known by me, there is not at this time a compact device for permitting manual or automatic adjustment which is enclosed in a casing and functions as a unitary brake applying device and also as a combination automatically operated and manually operated adjusting device which is readily mounted upon the conventional cam shaft of a brake.

Therefore, one object of the invention is to provide a brake applying casing mounted on a cam-carrying shaft and having incorporated therewith a compact structure mounted within the casing and including in its construction means for manually adjusting a brake after a motor vehicle has been brought to a stop and automatically operated means for effecting adjustment of worn brakes which is actuated when brakes are applied.

Another object of the invention is to provide an automatic brake adjusting device for each brake which includes in its construction an independently operable element constituting the means for manually adjusting the brake, the automatic adjusting means being inactive when a brake is applied by movement of the casing in a brake-applying direction within its normal extent of movement, additional movement of the casing in a brake-applying direction allowed by wear is followed by automatic adjustment of the brake.

Another object of the invention is to provide a combined automatic and manually operated brake adjusting device wherein the element constituting the manually operated adjusting means may be actuated from the exterior of the casing so that when the motor vehicle is brought to a stop and an adjustment is to be made, this may be very easily done by use of a wrench or other appropriate tool and without opening or otherwise disturbing the casing.

Another object of the invention is to provide improved brake-shoe adjusting mechanisms including a worm rotatably mounted in a casing into which the cam-carrying rocker shaft of the brake mechanism extends, the worm being in mesh with a worm gear carried by the cam shaft and said worm having associated with it manually operated means for rotating the worm to effect adjustment of a shaft carrying the brake shoe operating cam and also means for automatically rotating the worm and thus turning the cam carrying shaft to an adjusted position which will compensate for wear upon the brake lining.

Another object of the invention is to provide a combined manually operated and automatically operated brake adjusting means wherein the manually operated adjusting means consists of a spindle serving as a mounting for the worm and having one end protruding from the casing and formed with a wrench-engaging head by means of which it may be manually turned for adjusting the cam-carrying shaft.

Another object of the invention is to provide a combined manually operated and automatically operated brake adjusting mechanism wherein the spindle carrying the above mentioned worm is formed with a bore through which passes a rod carrying a ratchet which cooperates with a pawl carried by the spindle, the ratchet being yieldably held in engagement with the pawl, and means being provided for imparting operative movement to the pawl during application of the brakes, but the said movements imparted to the pawl by application of brakes being only sufficient to automatically effect adjustment of the brakes when such adjustment of the brakes is necessary.

Another object of the invention is to provide means for imparting movements to the pawl consisting of a lever pivotally mounted through a wall of the casing in which the manually and automatically operated adjusting mechanism is mounted, the said lever being engaged with a member which is adjustably mounted so that the extent to which the lever is moved during movement of the casing in a brake-applying direction may be controlled.

Another object of the invention is to so form and so mount the ratchet that while it turns with the spindle carrying the worm it may have movements longitudinally of the spindle, the said longitudinal movement in a direction away from the pawl being resisted by a spring tensioned by a nut which not only serves to tension the spring but also limits movement of the ratchet away from the spindle and the pawl carried thereby, and provides means to manually disengage the ratchets to permit release adjustment when required.

Another object of the invention is to provide an improved brake operating device and associated manually operated and automatically operated brake adjusting means which can be easily taken apart for cleaning or replacement of parts when necessary and which may be readily applied to the cam-carrying shafts of a brake of conventional construction.

Another object of the invention is to provide constant engagement of the braking parts of the brake adjuster so as to assure a brake application at all times, regardless of the adjusting parts of the brake adjuster.

Another object of the invention is to provide a brake adjuster including a worm gear, and which worm gear will not back off in use, for if such backing off should occur, loose brakes would result.

With these and other objects in view, the invention is illustrated in accompanying drawings wherein Fig. 1 is a perspective view showing brake operating mechanism of the approved construction, operatively associated with brake drums;

Fig. 2 is a vertical sectional view upon an enlarged scale taken along the line 2—2 of Fig. 1;

Fig. 3 is a fragmentary view taken along the line 3—3 of Fig. 2;

Fig. 4 is a sectional view taken along the line 4—4 of Fig. 3;

Fig. 5 is a view taken along the line 5—5 of Fig. 4 with portions in elevation and portions in section;

Fig. 6 is a view similar to Fig. 4 with portions broken away;

Fig. 7 is a group view showing elements of the brake mechanism, certain of these elements being in perspective and others in longitudinal section.

In Figure 1 there has been shown brake shoes 1 and 2 which are of conventional construction and are urged toward each other by a spring 3 so that normally the brake shoes are out of gripping engagement with the brake drum (not shown in the drawings). Ends of the brake shoes are spaced from each other and between these spaced ends of the shoes is disposed a cam 4 carried by the usual shaft 5. This shaft which is a rocker shaft, extends into a casing 6 having removable closure plates 7 and 7ª at its opposite side. A worm gear 8 is splined to the portion of the rocker shaft which fits within the casing and in order to hold the rocker shaft against longitudinal movement out of its proper position within the worm gear, it has provided a securing screw or bolt 9 which passes through a washer 10 and is screwed into a threaded socket 11 formed in the shaft 5 axially thereof. Other means are sometimes provided for holding the adjuster in place.

An arm or lever 12 extends upwardly from the casing 6 and its upper portion is formed with a number of openings 13 through one of which passes a bolt 14 by means of which the arm 12 is pivotally connected with a head 15 at the outer end of a piston rod 16 projecting from a cylinder 17. This cylinder 17 is of the conventional type used for air or vacuum brakes, and when the piston rod is moved longitudinally, the casing and the rocker shaft have a rocking movement imparted to them so that the cam member or head 4 will be turned in a direction to shift the brake shoes 1 and 2 away from each other and into tight gripping engagement with the brake drum to stop movement of a motor vehicle. Rocking movement of the shaft with the casing is accomplished by means of a worm 18 which is mounted in the casing transversely of the shaft 5 and meshes with the worm gear 8.

In order to support the worm in the casing and in mesh with the worm gear 8, there has been provided a spindle 19 which passes through the bore of the worm and is rotatably mounted through openings 20 and 21 formed in the portions 22 and 22a of the casing. Worm 18 is splined upon the spindle so that it will turn with the spindle. At its front end, the spindle is formed with a head 23 disposed externally of the casing and in order that it may be engaged by a wrench and the spindle turned manually. When the spindle is so turned, the worm turns with it and rotary motion is imparted to the worm gear and to the rotatable shaft 5. Therefore, the head or cam 4 of this shaft will be turned to adjusted brake-applying positions, and the shoes will be disposed in such relation to the brake lining that when the shaft 4 is turned during a brake-applying operation, the brake shoes will tightly grip the brake drums and quickly stop forward or rearward movement of the motor vehicle. This manual adjustment of the brake mechanism is provided so that the driver of the motor vehicle may adjust a brake if it is found that one brake does not function properly when the brakes are applied or if for some reason the automatic adjusting mechanism fails to operate properly.

In order to cause automatic adjustment of the brake applying mechanism and thus make manual adjustment practically unnecessary, there has been provided a mechanism so constructed that rocking movement of the casing in a brake-applying direction beyond a normal extent will cause movement of the rocker shaft 5 to an adjusted brake applying position.

Referring to Figure 7, it will be seen that the spindle 19 is formed with a longitudinally extended axially disposed bore 24. At its rear end, the bore is enlarged to form a socket 25 which has flat walls and is square in cross section. The forward end of the bore is enlarged to a greater extent and forms a spring seat 26 which is circular in cross section and in turn has its outer end enlarged to form a socket or seat 27 having a shoulder 28 about its inner end. This socket 28 is formed in the head 23 of the spindle.

A rod 29 passes longitudinally through the spindle and at its rear end has a large disc-shaped head 30 formed with ratchet teeth 31 upon its inner side face. Close to this head or ratchet member 30, the pin or rod 29 is formed with a squared portion 32 which fits into the squared socket 25 and allows the rod to be shifted longitudinally through the spindle, but causes the spindle to be turned with the rod when rotary motion is imparted to the rod. The front end portion of the rod is threaded as shown at 33, and this front end portion of the rod passes through the spring seat 26 and carries a nut 34 which is screwed upon the rod and at its inner end has compressing contact with a helical spring 35 housed in the spring seat 26. By tightening the nut, tension is applied to the spring and the spring then urges the rod forwardly. A shoulder 36 formed about the nut and engageable with the shoulder 28, limits tightening movement of the nut and also prevents the rod from being shifted rearwardly beyond a predetermined extent. Longitudinal pressure applied to this rod will result in separating the ratchet teeth, permitting reverse rotation of worm, as in tight brakes, or removing the adjuster.

In order that rotary movement may be imparted to the rod when the casing is moved in a brake-applying direction beyond its normal extent, there has been provided a pawl 37 having the form of a collar which fits loosely about the rear end portion of the spindle which protrudes from the portion 22a of the casing. This pawl or collar is formed with radially extending lugs 38 separated from each other by a slot 39 and the rear side face of the pawl confronting the inner side face of the head or ratchet 30 is formed with ratchet teeth 40 for engagement with the ratchet teeth 31 of the ratchet 30. A lever 41 passes through a bearing 42 mounted through an opening formed in a plate 43 constituting a rear wall for the casing. Within the bearing the lever is formed with a spherical enlargement or ball 44 which may have universal movement in the bearing and thus mounts the lever for universal tilting movement. The inner or front end portion of the lever 41 fits into the slot 39 between the lugs 38 and when the lever is tilted, rocking movement is imparted to the sleeve or pawl about the spindle. Ordinarily, the rocking movement of the pawl is not sufficient to impart turning movement to the rod and the spindle, but as rocking movement of the lever exceeds a distance necessary to apply the brake when the arm 12 and the casing are moved in a brake-applying direction, the teeth of the pawl slip over the teeth of the ratchet, re-engaging in a new position in relation to each other and on the return stroke of the adjuster, rotary movement will be imparted to the spindle and the worm and the worm gear 8. The rocker shaft 5 and the cam will then be rotated and the head or cam 4 and its shaft 5 will be turned to an adjusted brake-applying positon. Wear upon the brake lining will thus be compensated for and the brake shoes will be maintained in tight gripping engagement with the brake drum when the brakes are again applied.

Rocking movement of the lever is accomplished due to the fact that its outer end portion passes through a recess 45 leading from a side edge of a plate 46 which is disposed vertically back of the casing 6 and carries a threaded stem 47 passing through a horizontal slot 48 extending longitudinally from the front end of the forwardly extending arm 49 of a bracket 50. While this bracket has been shown secured against the cylinder 17 by screws 51, it will be understood that it may be rigidly secured upon any convenient stationary portion of the motor vehicle. After the stem 47 has been passed through the slot 48, the nut 52 is tightened to hold the plate 46 in a set position and upon loosening the nut, the plate may be shifted forwardly or rearwardly to proper position in order to vary the length of the braking stroke to meet the requirements of the particular installation at hand. It will thus be seen that when the piston rod 16 is moved longitudinally to impart rocking movement to the casing and cause application of the brakes, the lever 41 will at all times be moved to impart rocking movement to the pawl but, under normal conditions, this rocking movement will not be sufficient to cause turning of the rocker shaft 5 to an adjusting position. When, however, the brake lining becomes worn, the rocking movement of the lever 41 will be increased beyond its normal movement and the pawl will be turned. In this turning movement the teeth of the pawl will disengage with the teeth on the spindle and will re-engage in a new position in relation with each other. On the return stroke of the adjuster, rotary movement will be imparted to the spindle 19 and as the worm turns, the worm gear will have rotary motion imparted to it, and the shaft 5 turned to move the cam 4 to an adjusted brake-applying position. Therefore, wear upon the brake bands will be compensated for and the brakes maintained in their proper operating condition.

From the foregoing it will be seen that the brake adjuster includes component cooperative elements comprising the braking parts thereof and component cooperative elements comprising the adjusting parts of features thereof. Regardless of the adjusting parts, the braking component parts of the device are constantly in engagement.

With regard to the worm gear, the same is so mounted and disposed relative to the other component elements that it will not back off in use, and thus assure against loose brakes.

What is claimed is:

1. In a slack adjusting mechanism, a rockable shaft, a casing about said shaft, a worm gear upon said shaft within said casing, pressure operative means for rocking said casing and turning said rockable shaft, a worm in said casing meshing with said worm gear, a spindle carrying said worm and rotatably mounted in the casing and having means at one end for manually turning the spindle and the worm and thereby turning the rockable shaft to an adjusted position, the spindle carrying said worm being formed with a bore, a pin slidable longitudinally through said bore and turning with said spindle, a head at one end of said pin formed with ratchet teeth, a pawl rotatable about said spindle and formed with ratchet teeth, a spring urging said pin longitudinally and yieldably holding its teeth in mesh with teeth of the pawl, said pin being adapted to be moved longitudinally manually exteriorly of the casing to separate the teeth on the spindle and pin, a lever pivoted through a wall of said casing and at its inner end engaged with said pawl, and a member engaged by the outer portion of said lever and imparting tilting movement to the lever to rock the pawl about the spindle and intermittently impart turning movement to the pin and the spindle during rocking movement of the casing and thereby automatically turn the worm and effect turning of the rockable shaft to an adjusted position during rocking movement of the casing on its return stroke after a forward rocking stroke beyond a normal extent.

2. In a slack adjusting mechanism, a rockable shaft, a casing about said shaft, a worm gear upon said shaft within said casing, pressure operative means for rocking said casing and turning said rockable shaft, a worm in said casing meshing with said worm gear, a spindle carrying said worm and rotatably mounted in the casing and having means at one end for manually turning the spindle and the worm and thereby turning the rockable shaft to an adjusted position, the spindle carrying said worm being formed with a bore having a flat-walled socket at one end and its other end enlarged and forming a spring seat, a rod slidably passing through said bore and having one end portion flat sided and snugly fitting into said socket and causing turning of the rod with the spindle, a head at the said end of said rod disposed outwardly of the spindle and formed with ratchet teeth, a spring in said spring seat, the other end portion of said rod passing through the spring seat and surrounded by the spring and threaded from its end, a nut screwed upon the threaded end of said rod and tensioning the spring whereby the spring urges the rod longitudinally and yieldably holds the head toward the adjoining end of the spindle, a pawl loose about said spindle and having teeth yieldably engaged by the ratchet teeth of the head of said rod, whereby manual axial movement of the rod will disengage the teeth to permit reverse turning of spindle, and means for rocking the pawl about the spindle during rocking movement of the casing and thereby automatically turning the worm and effecting movement of the rockable shaft to an adjusted position.

3. In a slack adjusting mechanism, a rockable shaft, a casing about said shaft, a worm gear upon said shaft within the casing, a worm meshing with the worm gear, means for rocking said casing and thereby imparting turning movements to the rockable shaft, a spindle rotatably supporting said worm in said casing adapted to be manually turned and rotate the worm to turn the rockable shaft to an adjusted position, a ratchet carried by said spindle, a pawl companion to said ratchet mounted for movement about said spindle and yieldably engaged by said ratchet, a lever tiltably carried by said casing and engaged with said pawl and projecting from the casing, a stationary bracket having a portion extending toward said casing and formed with an elongated slot, a plate extending transversely of said bracket and having a threaded stem passing through said slot and carrying a nut tightened and holding the plate in adjusted spaced relation to the casing, said plate being formed with a horizontal recess, and said lever having its outer portion loosely passing through the recess and thereby being tilted to actuate the pawl to intermittently turn the rockable shaft to an adjusted position during abnormal rocking of the casing.

4. In a slack adjusting mechanism, a rockable shaft, a casing about said shaft, a worm gear upon said shaft within the casing, a worm meshing with the worm gear, means for rocking said casing and thereby imparting turning movements to the rockable shaft, a spindle rotatably supporting said worm in said casing adapted to be manually turned and rotate the worm to turn the rockable shaft to an adjusted position, a ratchet carried by said spindle, a pawl companion to said ratchet mounted for turning movement about said spindle and yieldably engaged by said ratchet, a lever tiltably carried by said casing and engaged with said pawl and having a portion projecting from the casing, a stationary support, a member carried by said support and shiftable toward and away from said casing to adjusted positions, said member being formed with a passage, and said lever having its outer portion loosely passing through said passage whereby the lever is thereby tilted to impart movement to said pawl about the spindle and effect turning of the rockable shaft to an adjusted position during rocking movement of the casing beyond a normal extent.

5. In a slack adjusting mechanism, a rockable shaft, a casing about said shaft, a worm gear upon said shaft within the casing, a worm meshing with the worm gear, means for rocking said casing and thereby imparting turning movements to the rockable shaft, a spindle rotatably supporting said worm in said casing adapted to be manually turned and rotate the worm to turn the rockable shaft to an adjusted position, a ratchet carried by said spindle, a pawl companion to said ratchet mounted for turning movements about said spindle and yieldably engaged by said ratchet, a lever tiltably carried by said casing and engaged with said pawl and having a portion projecting from the casing, a stationary support, a member carried by said support and shiftable toward and away from said casing to adjusted positions, said member being loosely engaged with said lever and tilting the lever to rock the pawl about the spindle and thereby automatically effect turning of the rockable shaft to an adjusted position during rocking movement of said casing.

6. In a slack adjusting mechanism for mounting on a cam shaft, a casing, a worm gear within said casing adapted for turning with said cam shaft, a worm in said casing meshing with said worm gear, a ratchet associated with said worm and turning therewith, a pawl supported for rotation on the rotary axis of the ratchet and worm and operatively engaged with teeth of said ratchet, a lever arm constituting an operating element for oscillating said casing and for rocking the worm gear, and means for yieldably holding the pawl axially into gripping engagement with the teeth of the ratchet and thereby allowing movement of the pawl to adjusted positions relative to the ratchet when the pawl is turned in one direction.

7. In a slack adjusting mechanism for mounting on a cam shaft, a casing, means for imparting normal rocking movement to said casing when mounted on said shaft, mechanism within said casing for turning the shaft with the casing having incorporated therein intermeshing gear members and a spindle rotatably mounting one of said gear members, said spindle having a tool-engaging portion at one end accessible from a position externally of the casing and adapting the spindle to be manually turned and thereby effect turning of the intermeshing gear members and the cam-carrying shaft to an adjusted position when the device is upon a vehicle, and means operatively associated with said spindle disposed within said casing and adapted to be automatically operated and thereby turn the spindle to effect adjusting of the cam-carrying shaft during abnormal rocking movement of the casing when mounted on the shaft, the said automatically operating means including a pawl and companion ratchet carried by the spindle, and a lever carried by the casing and acting upon the pawl to turn the ratchet and the spindle and thereby turn the intermeshing gear members and for turning the cam-carrying shaft during abnormal rocking of the casing when same is on the shaft for effecting adjusting of said cam-carrying shaft.

8. In a slack adjusting mechanism for mounting on a cam shaft, a casing, means for imparting normal rocking movement to said casing when mounted on said shaft, mechanism within said casing for turning the shaft with the casing having incorporated therein intermeshing gear members and a spindle rotatably mounting one of said gear members, said spindle having a tool-engaging portion at one end accessible from a position externally of the casing and adapting the spindle to be manually turned and thereby effect turning of the intermeshing gear members and the cam-carrying shaft to an adjusted position when the device is upon a vehicle, means operatively associated with said spindle disposed within said casing and adapted to be automatically operated and thereby turn the spindle to effect adjusting of the cam-carrying shaft during abnormal rocking movement of the casing when mounted on the shaft, the said spindle having a longitudinally extending bore formed with a non-circular socket at its inner end, the said one of the gear members turning with the spindle and being spaced from the inner end of the spindle, the automatically operated means including a rod passing through said bore and having the inner end portion seated in the socket and thereby causing the spindle and the rod to turn as a unit, the said inner end of the rod protruding from the socket, a ratchet rigid with the protruding end of the rod, a pawl loose about the inner end of said spindle and cooperating with the ratchet, a lever carried by said casing with a portion engaging said pawl and a portion projecting from the casing, and a member for engagement with the outer portion of said lever and imparting movement to the lever to operate the pawl about the spindle and actuate the pawl to rotate the spindle and the gear member and for turning the cam shaft to an adjusted position during abnormal rocking of the casing when mounted on the cam shaft.

9. In a slack adjusting mechanism for mounting on a cam shaft, a casing, means for imparting normal rocking movement to said casing when mounted on said shaft, mechanism within said casing for turning the shaft with the casing having incorporated therein intermeshing gear members and a spindle rotatably mounting one of said gear members, said spindle having a tool-engaging portion at one end accessible from a position externally of the casing and adapting the spindle to be manually turned and thereby effect turning of the intermeshing gear members and the cam-carrying shaft to an adjusted position when the device is upon a vehicle, and means operatively associated with said spindle disposed within said casing and adapted to be automatically operated and thereby turn the spindle to effect adjusting of the cam-carrying shaft during abnormal rocking movement of the casing when mounted on the shaft, the said spindle having an outer end projecting from the casing and an inner end projecting from the gear member carried by the spindle, said spindle having a longitudinal bore open at inner and outer ends, a pawl loose about the projecting inner end portion of said spindle, a rod passing through said bore and projecting from the inner end of the spindle, said rod turning with the spindle and being slidable longitudinally in the bore, a ratchet rigid with the inner end of said rod, a spring in said bore yieldably holding the ratchet in engagement with the pawl, a lever having a portion thereof projecting within the casing and another portion projecting beyond the casing, a mechanism disposed outwardly of the casing and engaged with the outwardly projecting portion of the lever, and automatically operated to actuate the pawl and thereby turn the spindle and the gear members to turn the cam-carrying shaft to an adjusted position when the casing is abnormally rocked.

10. In a slack adjusting mechanism for mounting on a cam shaft, a casing, means for imparting normal rocking movement to said casing when mounted on said shaft, mechanism within said casing for turning the shaft with the casing having incorporated therein intermeshing gear members and a spindle rotatably mounting one of said gear members, said spindle having a tool-engaging portion at one end accessible from a postion externally of the casing and adapting the spindle to be manually turned and thereby effect turning of the intermeshing gear members and the cam-carrying shaft to an adjusted position when the device is upon a vehicle, and means operatively associated with said spindle disposed within said casing and adapted to be automatically operated and thereby turn the spindle to effect adjusting of the cam-carrying shaft during abnormal rocking movement of the casing when mounted on the shaft, the said automatically operated means including a pawl loosely carried by the spindle, a ratchet carried by the spindle and turning therewith and engaged by the pawl, a lever tiltably carried by said casing and engaged with said pawl and having a portion projecting from the casing, and a member adapted for engagement with the outer portion of said lever and for imparting tilting movement to the lever for rotating the pawl about the spindle and thereby turning the spindle and the gear member and for turning the shaft and the cam to an adjusted position during abnormal rocking of the casing when mounted on the cam shaft.

References Cited in the file of this patent

UNITED STATES PATENTS

| | | |
|---|---|---|
| 1,661,191 | Midboe | Mar. 6, 1928 |
| 1,793,470 | Enderby | Feb. 24, 1931 |
| 2,347,186 | Freeman | Apr. 25, 1944 |
| 2,348,734 | Freeman | May 16, 1944 |
| 2,377,014 | Keller | May 29, 1945 |
| 2,522,903 | Shively | Sept. 19, 1950 |
| 2,551,888 | Learn | May 8, 1951 |
| 2,554,065 | Shields | May 22, 1951 |
| 2,561,454 | Williams | July 24, 1951 |
| 2,650,681 | Shively | Sept. 1, 1953 |

FOREIGN PATENTS

| | | |
|---|---|---|
| 327,713 | Germany | Oct. 15, 1920 |